May 1, 1951 D. V. MOSES ET AL 2,551,281
AUTOMATIC GAS ANALYZER
Filed Nov. 29, 1944 2 Sheets-Sheet 1
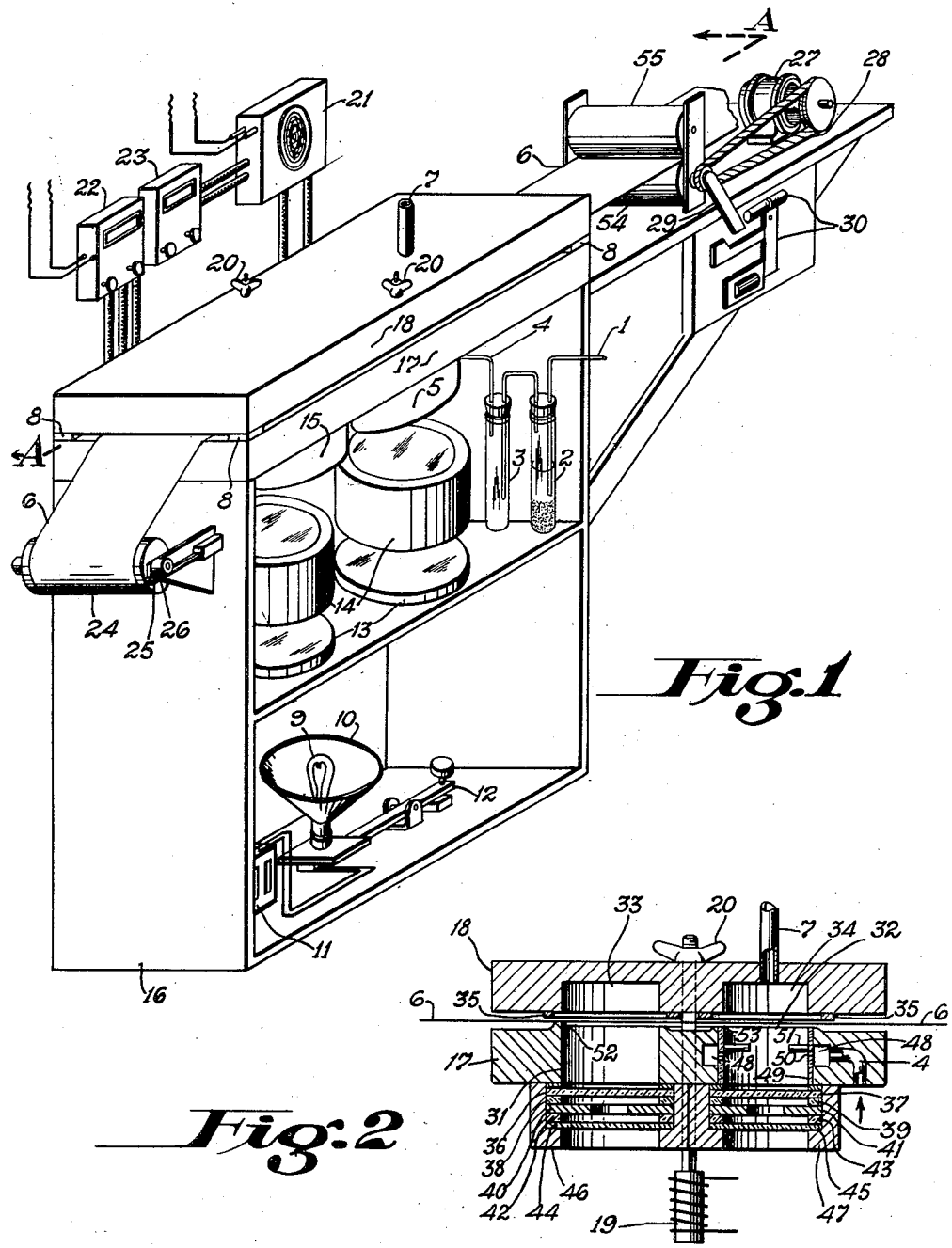
Fig.1
Fig.2
Douglas V. Moses
John W. Brumbaugh INVENTOR.
BY 
ATTORNEY Patented May 1, 1951

2,551,281

UNITED STATES PATENT OFFICE 2,551,281

AUTOMATIC GAS ANALYZER

Douglas V. Moses and John W. Brumbaugh, Charleston, W. Va., assignors to E. I. du Pont de Nemours & Company, Wilmington, Del., a corporation of Delaware Application November 29, 1944, Serial No. 565,738

5 Claims. (Cl. 23—255)

This invention relates to gas analysis and an instrument for automatically recording the amount of a gas present in a gaseous mixture. More particularly the invention is concerned with determining and recording intermittently the concentration of hydrogen sulfide or other gas to be measured by passing a gas through a chemically impregnated gas permeable tape or ribbon and measuring the light reflecting power thereof.

It is known that hydrogen sulfide will react with lead acetate to give a black precipitate varying in intensity with the amount of sulfur reacting with the lead acetate. It is also commonly known that the depth in color will cause a corresponding change in light absorption of appropriate wave length. Advantage has been taken of these principles in known recording analyzers in which a measured flow of gas containing a reactive constituent is contacted with color forming materials in solution, with a subsequent automatic measurement of light absorption furnishing the actuating electrical differential for a recording mechanism. An improvement in such analyzers is disclosed in the D. V. Moses et al. U. S. Patent, 2,232,622 of February 18, 1941. The instant case is a further modification and improvement particularly directed to the continuous analysis of minute quantities of a gas in a gaseous mixture of it.

An object of the invention is to provide an improved method of gas analysis and novel means for its accomplishment. Another object is to provide gas analyzing means responsive to color changes resulting from passing a gas through a chemically impregnated gas permeable tape. Still another object is to measure by comparison a chemically stained tape and an unstained tape by a new and novel mechanism and to provide a process whereby it is operated. Yet another object is to provide a highly active gas by humidifying it prior to its analysis.

Other objects and advantages of the invention will hereinafter appear.

These objects are accomplished according to the invention, particular features and advantages of which will be apparent from a consideration of the accompanying drawings and the ensuing description. As has been emphasized in the related patent, gas permeable tape impregnated with color forming material possesses many advantages over the formerly used solution contact methods. The rate of flow and duration of flow of the gas being measured through the tape makes it possible to measure very small amounts of hydrogen sulfide or other gas, amounts undetectable by devices heretofore employed.

There follows a description of one of the numerous embodiments of the invention in which the same number is given to similar parts throughout the description. Referring to the drawings:

Fig. 1 is a perspective view of the assembled device.

Fig. 2 is a sectional view along line A—A of Fig. 1, of a gas collector and photocel arrangement.

Figure 4:
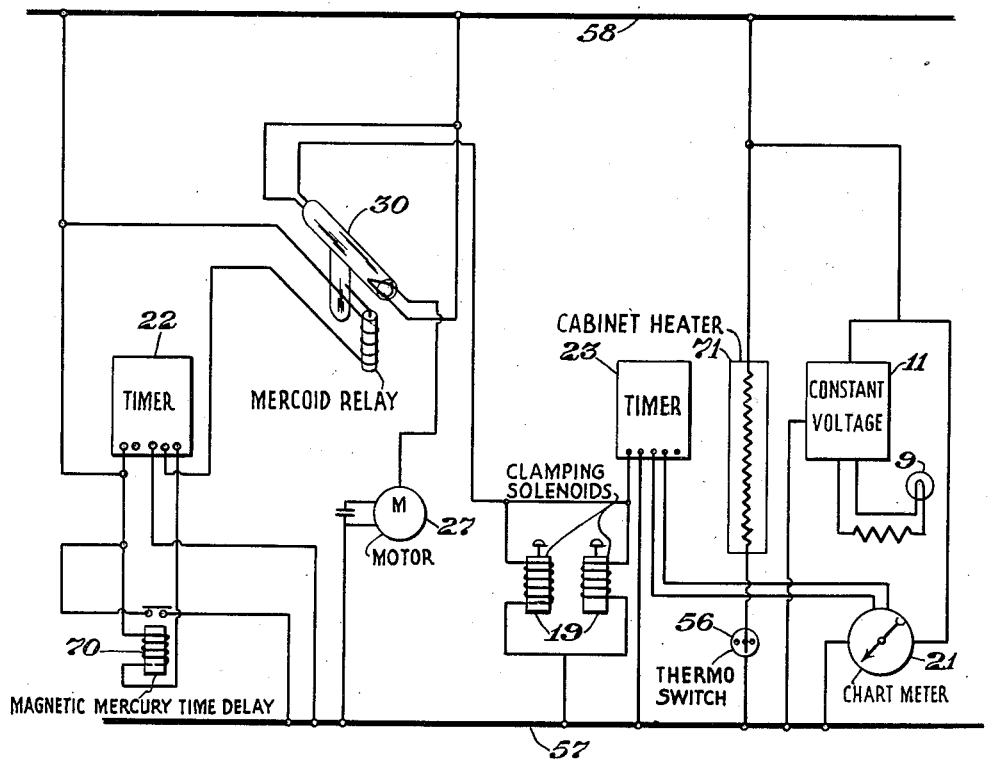
Fig. 4 is a wire diagram of the electrcal power system used for the lighting source and for the actuation and control of the tape movement.

With reference now to Fig. 1, which illustrates the device mounted in a cabinet 16, movable tape 6 passes through the top thereof. The tape 6 is made of a gas permeable chemically treated fabric as, for example, an un-inked typewriter ribbon which has been previously air-dried after being treated with an aqueous solution containing 10% lead acetate, 5% acetic acid and 15% glycerine. Tape 6 is supplied from roll 24, the turning of which is resisted by a spring brake 25 acting on wheel 26 which is fixed to revolve with roll 25. A suitable cover, not shown, protects the tape from atmospheric contamination.

The tape 6 is positioned lengthwise between the gas contactor 17 and the gas collector 18. Movement of the tape 6 is initiated by rollers 54 and 55, roller 54 being driven by motor 27 through the pulley and spring belt arrangement 28. The spring belt arrangement 28 provides a flexible connection between motor 27 and roll 54 allowing slippage when necessary, the spring belt 28 being driven by a pulley so geared to the motor 27 that it revolves at the rate of about 60 R. P. M. A projection 29 is fixed to one end of roll 54 and operatively engages a projection integral with a gravity operated mercury (Mercoid) switch 30, the projection 29 is so arranged that it engages the projection on the Mercoid switch 30 once during each revolution of roll 54.

The gas handling system comprises a metering and pressure regulating apparatus of well-known type, not shown, which regulates and indicates the volume of gas supplied, a bubbler-bottle 2 containing a saturated aqueous solution of ammonium nitrate which maintains a definite relative humidity of less than 100%, a trap 3 either empty or packed with an inert material such as glass wool for removal of entrained mist or dust and the required connections. The gas handling and conditioning equipment is enclosed in the upper compartment of cabinet 16, enclosure not shown, and the temperature in this compartment is maintained at a definite temperature say 35° C. by a suitable means such, for example, as by an electrical resistance heater 71 and a thermal switch 56, see Fig. 4.

The optical system is a light source, duplicate light filters and duplicate condensing lenses. The light bulb 9 supplied with current from the constant voltage transformer 11, is mounted in a parabolic reflector 10, which is in turn mounted on lever arm 12. The lever arm is arranged so that the light beam may be tilted whereby the proportion of light delivered to duplicate blue filters, 13, with a wave length of approximately 450 millimicrons (although other suitable wave length may be used), mounted in the floor of the upper compartment of cabinet 16 serve to transmit the rays to the duplicate condensing lenses 14. The filters serve to enhance the difference in reflectivity between unstained and stained tape. The condensing lenses 14 gather light from the filters 13 and focus the beams through the center openings in the center of photoelectric cells 40 and 41 (see Fig. 2) in such a manner that essentially all of the lower surfaces of the tape 6 above the openings 31 and 32 are covered by the light beam. Reflection from the tape is projected on the upper active surface of the photoelectric cells 40 and 41. Current generated in the photoelectric cells is transmitted by appropriate connections to the recorder 21.

Timers 22 and 23 serve to institute and terminate the cyclic action of the analyzer which will be described later.

Fig. 2 shows a cross section taken lengthwise of the gas contactor 17 and the gas collector 18 along line A—A of Fig. 1. The tape 6 covers compartments 31 and 32 in the gas contactor 17 and compartments 33 and 34 in the gas collector 18, and extends beyond the edge of each compartment sufficiently to provide a gastight seal when the gas collector 18 is clamped against gas contactor 17 and the tape 6 is thereby pressed against the upper contactor face by the gaskets 35 which are fixed on the lower gas collector face 18. Small rims 52 and 53 on the edge of compartments 31 and 32 serve to stretch the tape smoothly over the openings when clamped. Clamping of the tape is accomplished by actuating the dual solenoids 19 which transmit their downward tension to the gas collector 18 via the extension rods and wingnut arrangements 20.

Compartments 31 and 32 in the gas contactor 17 are covered in a gastight manner at their lower extremity by transparent windows 36 and 37 respectively. Underlying the windows 36 and 37 are contact rings 38 and 39 which make electrical contact with the active upper faces of the barrier layer photoelectric cells 40 and 41 respectively. A second pair of contact rings 42 and 43 make contact with the lower faces of the photoelectric cells 40 and 41, respectively. The assembly is sealed against atmospheric contamination by a second pair of transparent windows 44 and 45 and follower rings 46 and 47. Appropriate electrical outlets, not shown, communicate with the contact rings 38, 39, 42 and 43. The complete assembly which covers compartment 31 is shown as 15 on Fig. 1 and is termed the standard photocell in the description of the method of operation which follows. Likewise the assembly which covers compartment 32 is designated as 5 on Fig. 1 and termed the primary photocell.

Compartment 32 through which gas is passed is fitted with a gas inlet 4 and a circular gas distributing space 48, Fig. 2, covered in a gastight manner by a cylinder of impervious material 49 which is perforated with a series of small distributing orifices 50. A baffle of transparent material 51 aids gas distribution. Compartment 34 is fitted with a vent 7 which may be connected with a suitable means of disposal for the waste gas.

Operation of the apparatus for the detection of hydrogen sulfide in a gaseous mixture containing it is as follows: A metered flow of the gas is passed at a constant rate through inlet 1 into humidifier 2 where it is adjusted to a relative humidity of about 60%. The gas then passes through trap 3 and connection 4 into distributing ring 48 through orifices 50 and through impregnated tape 6 where it produces a stain proportional in depth to the hydrogen sulfide concentration in the gas and the quantity of the gas allowed to pass through the system while the tape is exposed. The waste gas passes into compartment 34 and through vent 7.

Light from the bulb 9 passes through the filters 13, the condensing lenses 14 and through the photocell assmblies 15 and 5 to the tape. Reflection of the light from the tape 6 to the photoelectric cells 40 and 41 causes electrical impulses which are transmitted to the recorder 21. In the recorder these impulses are electrically subtracted so that the movement of the recorder and the resulting record represents the difference between the current flow from the standard photoelectric cell 15 exposed to reflection from the unstained tape and the current flow from the primary photoelectric cell 5 exposed to reflection from the stained tape. By the application of proper factors determined experimentally, this difference is converted to terms of the hydrogen sulfide concentration. This may be effected by the use of standard gases containing known amounts of hydrogen sulfide or other gas being measured. It is readily possible to determine the amount of movement produced in the recorder 21 by various concentrations and to construct a scale or chart from which concentrations in any of the standard units of expression, such as grains of hydrogen sulfide per 100 cubic feet of gas can be read directly.

At the end of the measurement cycle, timer 23 disconnects the driving power from the recorder causing the recorder pen actuating mechanism to remain stationary. The recorder clock 21 mechanism, however, continues to function. Gas continues to flow without interruption. At the end of this idle period which may vary from a few minutes to a few hours depending on the desired time between observations, timer 22 actuates the solenoid of switch 30 which breaks the circuit to the clamping solenoids 19 which hold contactor 17 and collector 18 tightly clamped together allowing the compressed springs 8 to separate them sufficiently to permit the tape to move freely. Simultaneously the motor 27 is started driving the roll 54 and causing the exposure of fresh sections of tape on compartments 31 and 32. When the roller 54 has made approximately one revolution the projection 29 engages the switch 30 which disconnects the motor and reconnects the clamping solenoids again clamping the tape and stopping its movement. At this time timer 23 is reset and started on its repeat cycle. Drift of the motor is allowed to cause slippage in the spring belt 26. The timer 22 resets itself during the operation of switch 30 after a slight delay provided by a magnetic mercury switch. Another cycle is then commenced. The period of the cycle and the period of tape exposure may be varied by adjustment of the timers. A wide range of hydrogen sulfide concentrations may be covered by cycle changes and by varying the gas flow as required.

Figure 3:
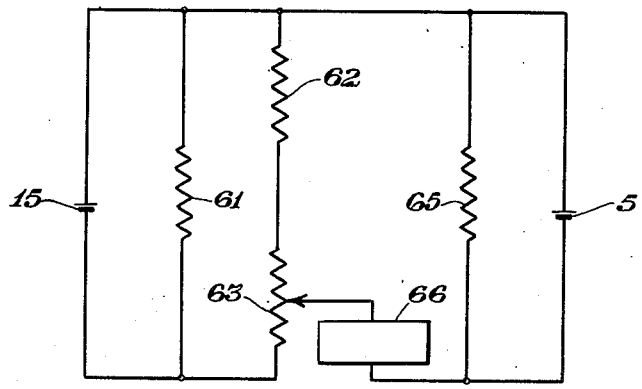
Fig. 3 is a wire diagram of the electrical circuit containing the photocells and recorder unit.

The photoelectric cells 5 and 15 and the recorder circuit is illustrated by Fig. 3. This circuit comprises essentially a "continuous balance" potentiometer circuit well known in the recording instrument field. A standard photoelectric cell 15 provides the source of reference voltage. A photocell shunt resistance 61 is placed in parallel with a fixed resistance 62 and a slide wire resistance 63. Opposing this arrangement is the primary photocell 5 with its shunt resistance 65, the voltages between the standard photocell 15 and the primary photocell 5 being opposed across the main slide wire 63 as shown. The values of the photocell shunt resistance 61 and 65 together with that of the fixed resistance 62 are chosen in such a manner that when the photocells 5 and 15 are both exposed to reflection from unstained tape, the potentials are balanced with the main slide in the so-called zero position at the lower end of slide wire resistance 63. When the primary cell 5 is exposed to the reflection from stained tape the system is unbalanced causing a current to flow. This current is converted to alternating current by converter 66, is amplified and passed through a motor, not shown, which resets the slide to the new position necessary to rebalance the potentials in the system. The position of the slide required to balance the potential is recorded on a moving chart, not shown. It is to be understood that the above description of the recorder is typical only and that any potentiometric recorder of well-known type possessing the required sensitivity may be used.

Fig. 4 is a diagram of the electrical power system in the analyzer and illustrates the connections to the various component parts. The light bulb 9 is supplied with current from the constant voltage transformer 11 which is connected to the 110 volt power lines 57 and 58. The cabinet resistance heater 71 is connected to power line 58 and through the thermoswitch 56 to power line 57. The chart motor of the recorder 21 is connected to the power lines 57 and 58. The power supply to the balancing motor in recorder 21 is controlled by timer 23 which is connected to 57 and via the mercoid relay 30 to 58. Clamping solenoids 19 are connected to 57 and via mercoid relay 30 to 58. The tape motor 27 is connected to 57 and via the mercoid relay to 58. Timer 22 is connected to the two power lines 57 and 58, to the solenoid of the mercoid relay 30 and to time delay 70. The time delay is interposed in the timer circuit in such manner that a slight delay is produced which gives the time necessary for automatic resetting of timer 23 and relay 30.

The electrical changes occurring during an analyzer cycle are as follows: At the start of the measurement period the clamping solenoids 19 are energized, the recorder 21 is operating to measure and record the electrical impulses transmitted to it and both timers 22 and 23 are functioning to measure their respective time intervals. At the end of the measurement, timer 23 opens the power circuit to the balancing motor of recorder 21 causing the indicating pointer and recorder pen to remain stationary at their last position. The chart actuating mechanism of recorder 21 continues to function. This idle period, in which no observations are taken, is chosen at will and may vary from minutes to hours as the occasion demands. At the end of the idle period, timer 22 actuates closing the circuit to the solenoid of relay 30. The time delay 70 functions to allow time for the relay 30 to function and for timer 22 to reset. The relay 30 then opens the circuit to the clamping solenoids 19 and to timer 23 which resets. The motor circuit is closed and the motor 27 starts. Motor 27 continues to operate until the projection 29 (see Fig. 1) actuates relay 30 in a reverse direction from the foregoing. This energizes the clamping solenoids 19, and timer 23 and disconnects the motor 27. Energizing of the timer 23 starts the balancing motor in the recorder and sets conditions for a repeat cycle.

During operation of the analyzer the temperature of the cabinet enclosing the measuring equipment is controlled to some temperature above atmospheric by action of the thermoswitch 56 and resistance heater 71.

As will be appreciated by those skilled in the art the recorder may be used for detecting small amounts of a gas in a mixture containing it. Illustrating examples include:

| Type of gas | Active Constituent | Impregnated Material |
| --- | --- | --- |
| Illuminating | Hydrogen sulfide | Alkaline lead acetate. |
| Do | Nitrogen peroxide | Griess reagent. |
| Air | Hydrogen cyanide | Congo red. |
| Exhaust gas | Carbon monoxide | Palladium chloride. |

We claim:

1. A recording instrument for gas analysis involving tape travel and tape impregnation phases of a detecting cycle, comprising in combination a tape color sensitive to a gas, an exposure chamber subdivided by the tape into a gas inlet compartment and a gas exit compartment, means for passing the tape between the compartments, means for passing gas through the compartments and through the tape subdividing the chamber, a photoelectric cell positioned in the gas compartment opposite and in direct view of the tape whereby the color intensity of the tape is measured by the photoelectric cell during the tape's impregnation with the gas being analyzed, said compartments being capable of restricted movement apart to permit the tape freedom to pass between the compartments during the tape travelling phase and movement together to hold the tape by the juxtaposition of the compartments during the tape impregnating phase of the detecting cycle.

2. A recording instrument as described in claim 1 which includes timing means constructed and arranged for adjusting the time of exposure of the tape during the impregnation phase of the detecting cycle.

3. A recording instrument as described in claim 1 which includes timing means constructed and arranged for starting and stopping the travel of the tape to permit adjustable delay of periods between observations of the impregnated tape.

4. A recording instrument for gas analysis involving tape travel and tape impregnation phases of a detecting cycle, comprising in combination a tape color sensitive to a gas, an exposure chamber subdivided by the tape into a gas inlet compartment and a gas exit compartment, means for passing gas through the compartments and the tape positioned between the compartments, means for passing the tape between the compartments, a photoelectric cell positioned in the inlet gas compartment opposite and in direct view of the tape whereby the color intensity of the tape is measured by the photoelectric cell during the tape's impregnation with the gas being analyzed, the compartments cooperating with means to define a space permitting the tape to run freely therethrough during the tape travelling phase, and holding the tape therein as a diaphragm between the compartments during the impregnating phase of the detecting cycle.

5. A recording instrument for gas analysis involving tape travel and tape impregnation phases of a detecting cycle, comprising in combination a tape color sensitive to a gas, an exposure chamber divided by the tape into lower gas inlet and upper gas exit compartments, the upper compartment being mounted for restricted movement away from the lower compartment to provide free passage of the tape during the tape travelling phase and in juxtaposition on the lower compartment to hold the tape as a diaphragm between the the compartments during the impregnating phase of the detecting cycle, a photoelectric cell positioned in the gas exposure chamber opposite and in direct view of the tape whereby the color intensity of the tape is measured by the photoelectric cell during the tape's impregnation with the gas being analyzed.

DOUGLAS V. MOSES.
JOHN W. BRUMBAUGH.

REFERENCES CITED

The following references are of record in the file of this patent:

UNITED STATES PATENTS

| Number | Name | Date |
|---|---|---|
| 2,113,063 | Stryker et al. | Apr. 5, 1938 |
| 2,232,622 | Moses et al. | Feb. 18, 1941 |
| 2,345,090 | Brace | Mar. 28, 1944 |

OTHER REFERENCES

Instruments, vol. 14, page 214, July 1941.